(12) United States Patent
de Sandro et al.

(10) Patent No.: US 6,901,775 B2
(45) Date of Patent: Jun. 7, 2005

(54) METHOD AND APPARATUS FOR PROVIDING A UNIFORM COATING THICKNESS ALONG AN AXIAL DIRECTION WITHIN A SUBSTRATE TUBE

(75) Inventors: Jean-Philippe J. de Sandro, Beaconsfield (CA); Keith L. House, Corning, NY (US); Joohyun Koh, Horseheads, NY (US); Prantik Mazumder, Corning, NY (US)

(73) Assignee: Corning Incorporated, Corning, NY (US)

( * ) Notice: Subject to any disclaimer, the term of this patent is extended or adjusted under 35 U.S.C. 154(b) by 434 days.

(21) Appl. No.: 09/957,897

(22) Filed: Sep. 21, 2001

(65) Prior Publication Data

US 2003/0056548 A1 Mar. 27, 2003

(51) Int. Cl.⁷ .............................................. C03C 25/22
(52) U.S. Cl. .................. 65/530; 391/413; 391/414; 391/417; 391/531
(58) Field of Search .......................... 65/391, 413, 414, 65/417, 530, 531

(56) References Cited

U.S. PATENT DOCUMENTS

| | | | |
|---|---|---|---|
| 4,116,653 A | 9/1978 | Irven ................................ 65/2 |
| 4,145,458 A | 3/1979 | Koenings et al. ............. 427/39 |
| 4,233,045 A | 11/1980 | Sarkar .............................. 65/3 |
| 4,253,731 A | 3/1981 | Anderson et al. ........ 350/96.34 |
| 4,312,654 A | 1/1982 | Sarkar ......................... 65/3.12 |
| 4,405,655 A | 9/1983 | Tuin .............................. 427/38 |
| 4,417,911 A * | 11/1983 | Cundy et al. .................. 65/391 |
| 4,473,596 A | 9/1984 | Beerwald et al. ............. 427/10 |
| 4,490,008 A | 12/1984 | Murakami et al. ........ 350/96.34 |
| 4,504,113 A | 3/1985 | Baak ........................ 350/96.33 |
| 4,576,622 A * | 3/1986 | Jung ............................. 65/531 |
| 4,610,708 A | 9/1986 | Sarhangi et al. ............. 65/3.12 |
| 4,666,247 A | 5/1987 | MacChesney et al. ... 350/96.34 |
| 4,802,733 A | 2/1989 | Bachmann et al. ...... 350/96.34 |
| 4,813,989 A * | 3/1989 | Uchiyama et al. ............. 65/489 |
| 4,844,007 A | 7/1989 | Eikelboom ................... 118/723 |
| 4,944,244 A | 7/1990 | Moisan et al. ............... 118/723 |
| 4,971,614 A * | 11/1990 | D'Annessa et al. ........... 65/419 |
| 5,000,773 A * | 3/1991 | Le Noane et al. ............. 65/391 |
| 5,056,888 A | 10/1991 | Messerly et al. ........... 385/123 |
| 5,242,476 A | 9/1993 | Bartel et al. ................. 65/3.11 |
| 5,483,613 A | 1/1996 | Bruce et al. ................. 385/129 |
| 6,116,055 A | 9/2000 | Ishikawa et al. .............. 65/399 |

* cited by examiner

Primary Examiner—Peter Chin
(74) Attorney, Agent, or Firm—Svetlana Z. Short; Foley & Lardner LLP; Randall S. Wayland

(57) ABSTRACT

A method and apparatus for providing a uniform coating thickness along an axial direction within an internal portion of a substrate tube is disclosed. A gas delivery unit is configured to coat the internal portion of the substrate tube. The gas delivery unit includes an insert. At least one of an inner diameter of the insert, a length of the insert, a gap between the insert and the substrate tube, and a flow of the gas mixture delivered to the substrate tube is configured to provide the uniform coating thickness along the axial direction.

15 Claims, 4 Drawing Sheets

METHOD AND APPARATUS FOR PROVIDING A UNIFORM COATING THICKNESS ALONG AN AXIAL DIRECTION WITHIN A SUBSTRATE TUBE

FIELD OF THE INVENTION

The present invention relates generally to optical fibers. More particularly, the present invention relates to providing a substantially uniform coating thickness along an axial direction within a substrate tube.

BACKGROUND OF THE INVENTION

Referring to FIG. 1, there is shown a portion of a plasma chemical vapor deposition (PCVD) lathe. The PCVD lathe includes a gas supply unit 10 and a substrate tube 12. Gas supply unit 10 includes input ports 14, gauge ports 16a and gauges 16b, a rotary union 18, a bellows 20, and a torr seal extender 22. Gases (e.g., $SiCl_4$, $O_2$, $GeCl_4$, $C_2F_6$, etc.) are inputted into gas supply unit 10 via input ports 14. As the inputted gases travel toward substrate tube 12, gauges 16 are configured to monitor and maintain a steady gas pressure within gas supply unit 10 and substrate tube 12.

Rotary union 18 is configured to rotate substrate tube 12 about a longitudinal axis as is indicated by arrow "A." Torr seal extender 22 is a tube of inert material that is connected to substrate tube 12. Bellow 20 is disposed between rotary union 18 and torr seal extender 22, and is configured to force the gas mixture through torr seal extender 22 to substrate tube 12. Although in FIG. 1, a gap is shown between each of gauges 16 and rotary union 18, rotary union 18 and bellows 20, and bellows 20 and torr seal extender 22, each of these gaps are preferably sealed with clamps, o-rings, flanges, and/or caps such that gas supply unit 10 is maintained at a controlled (e.g., low pressure) environment.

The gas mixture is provided to an internal region of substrate tube 12, transformed into reactive species by plasma using a microwave applicator 15, and is used to coat or deposit one or more layers onto the internal region of substrate tube 12. Any waste gases are removed by an exhaust pumping unit 17. Such coated substrate tube 12 is subsequently collapsed, for example, by an oxy-hydrogen flame, as is well known in the art, to a fiber preform or collapsed cane.

The outer diameter of the preforms or canes formed by PCVD can vary as a function of the axial position or direction. For example, the outer diameter variation can be cyclic or periodic. FIG. 2 shows an example of the periodic variation in the outer diameter of a collapsed cane formed using PCVD. A vertical axis 30 indicates the outer diameters of the collapsed cane and a horizontal axis 32 indicates the axial positions of the collapsed cane. A line 34 fitted to the data shows the variation in the outer diameter to be substantially sinusoidal as a function of the axial position. The periodicity of the variation is 6.537 cm with respect to the axial direction. The difference between the minimum and maximum values of the outer diameter is 0.2126 mm. This difference translates to a mass difference of 0.12 g/cm of the collapsed cane. In other words, the amount of material deposited or coated onto the internal region of substrate tube 12 varies along the axial direction by an amount of ±4.3% by weight. Bending sensitivity due to cut-off variations and/or signal dispersion can be associated with an optical fiber formed from such a collapsed cane because the optical fiber will retain at least some of the non-uniformity of the cane when subsequently drawn.

Thus, there is a need for an apparatus and method of uniformly coating an internal region of a substrate tube along the axial direction. Further, there is a need for an apparatus and method of forming a collapsed cane having very small diameter variations along the axial direction.

SUMMARY OF THE INVENTION

One embodiment of the invention relates to a method of forming an optical fiber article, such as a preform or cane, from a substrate tube. The method includes providing a gas mixture to coat an internal region of the substrate tube with a uniformity within approximately 4% along an axial direction of the substrate tube. The method further includes collapsing the substrate tube to form a preform or cane.

Another embodiment of the invention relates to an apparatus for coating a substrate tube used to form a glass article having a substantially constant diameter along an axial direction. The apparatus includes a substrate tube holder and a gas delivery unit. The gas delivery unit is configured to coat an internal portion of a substrate tube holder with a thickness variation along the axial direction of approximately 4% or less.

Still another embodiment of the invention relates to an apparatus for internally coating a substrate tube using a plasma, the substrate tube extending along an axial direction. The apparatus includes a gas delivery tube configured to deliver a gas mixture. The gas delivery tube has a first end, a second end, a length, and an inner diameter. The apparatus further includes a connector disposed between the second end of the gas delivery tube and the substrate tube. The second end of the gas delivery tube and the connector being separated by a gap. At least one of the inner diameter of the gas delivery tube, the length, the gap, and a flow of the gas mixture is configured to internally coat the substrate tube to a substantially uniform coating thickness along the axial direction.

BRIEF DESCRIPTION OF THE DRAWINGS

The exemplary embodiments will become more fully understood from the following detailed description, taken in conjunction with the accompanying drawings, wherein like reference numerals denote like elements, in which.

DETAILED DESCRIPTION OF THE EXEMPLARY EMBODIMENTS

An advantageous apparatus and method of uniformly coating an internal region of a substrate tube during plasma chemical vapor deposition (PCVD) is disclosed herein. In exemplary embodiments, the geometry associated with a PCVD lathe or system is configured to affect the degree of coating uniformity. In particular, the geometry associated with a portion of the PCVD lathe or system that is upstream of the coating or deposition region is configured to affect the degree of coating uniformity.

Figure 3:
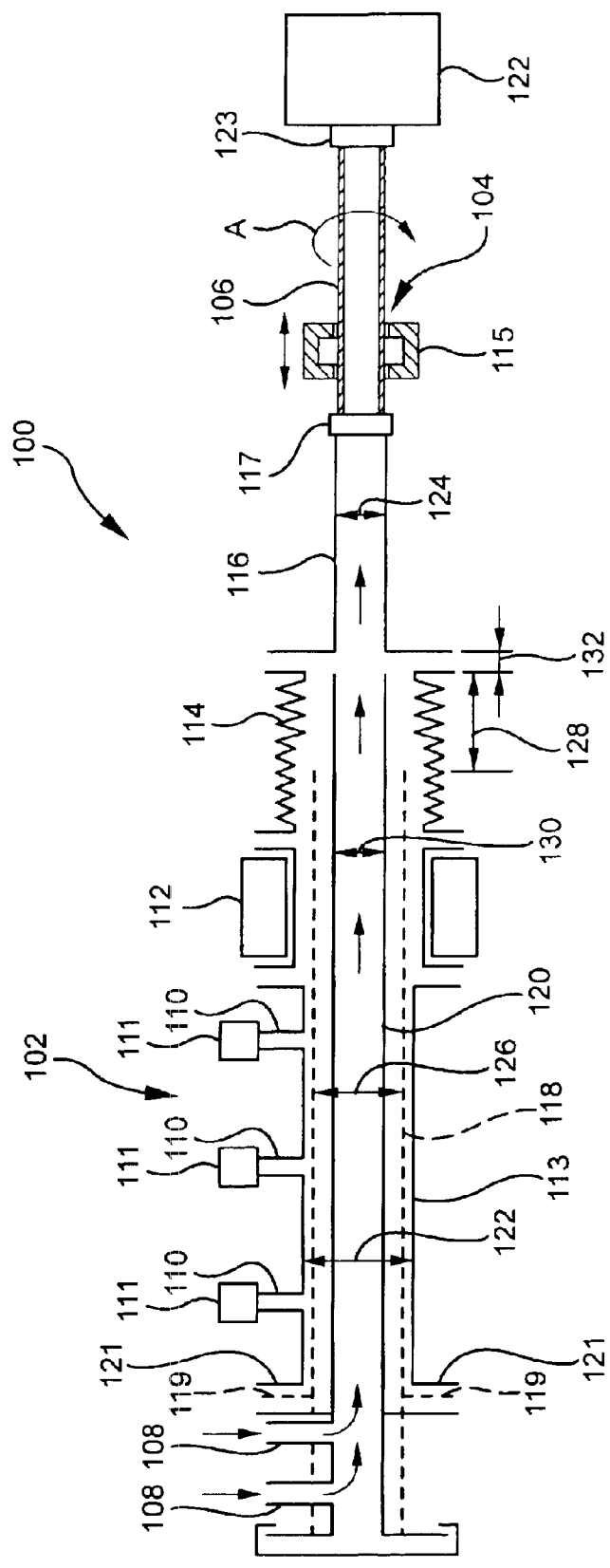
FIG. 3 is a schematic cross-sectional view of a portion of an PCVD system in accordance with an embodiment of the present invention.

Referring to FIG. 3, there is shown a cross-sectional view of a PCVD system or lathe 100. The relative sizes of the components are not drawn to scale. The PCVD system 100 includes a gas supply unit 102, a reaction zone 104, and an exhaust pumping unit 122. Reaction zone 104 is provided between gas supply unit 102 and the exhaust pumping unit 122. At the reaction zone 104, a microwave applicator 115 transforms process gas within a substrate tube 106 into a local area of plasma, which then coats the inside of substrate tube 106. Gas supply unit 102 includes gas inlets 108 for receiving the process gases, ports 110 upon which gauges 111 are mounted, housing 113, a rotary union 112, a bellows 114, a coupler 116, and an insert tube (e.g., a first insert tube 118 or a second insert tube 120).

Gas inlets 108, ports 110, rotary union 112, bellow 114, coupler 116, and substrate tube 106 are successively disposed and arranged next to each other. Gas inlets 108 and coupler 116 comprise the opposite ends of gas supply unit 102. Although, there are gaps shown between the components of gas supply unit 102, gas supply unit 102 is preferably maintained with a controlled environment by inclusion of clamps, o-rings, connectors, and/or sealers between the components. The insert tube 118 or 120, which is received inside the housing 113, extends almost the entire length of the interior of gas supply unit 102. Gas inlets 108 also comprise a part of the insert tube.

At gas supply unit 102, also referred to as a gas delivery unit, one or more process gases (e.g., $SiCl_4$, $O_2$, $GeCl_4$, $C_2F_6$, etc.) are inputted to gas inlets 108 and flow through the insert. Unit 102 is preferably maintained at approximately 100° C. to maintain any halide gases within the gas mixture at a high vapor pressure. As the process gases flow within the insert tube toward substrate tube 106, ports 110 are configured to accept one or more pressure gauges 111 (e.g., Baratron gauges) to monitor the pressure of the gas mixture. The pressure gauges 11 can be used as part of a control system, for example, to maintain the process gas mixture at a steady pressure during deposition. Rotary union or unit 112 is configured to rotate, in unison, the bellows 114, coupler 116, and substrate tube 106 during deposition. As an example, rotary union 112 may include a stepping motor for precise control of the rotation of substrate tube 106.

Bellows 114 is configured to direct the gas mixture exiting the insert tube into coupler 116. Coupler 116 can be a tube having one end connected to bellow 114 and the other end connected to substrate tube 106. As shown in FIG. 3, a cap connector 117 is provided between coupler 116 and substrate tube 106 to secure them to each other. A support 123 allows rotation of the tube and supports the other end of tube 106. Coupler 116 can be a conduit or a torr seal extender. Together, support 123 and coupler 166 function as a holder to support the tube 106. Depending upon the length of the coupler and tube, support 123 may not be required. In one embodiment, a diameter 122 of the interior of gas supply unit 102 may be 43 mm and a diameter 124 of the interior of coupler 116 may be 26 mm.

In one embodiment, substrate tube 106 is comprised of a silica material, a length in the range of about 1 m to 3 m, and an inner diameter in the range of about 15 mm to 25 mm. Alternatively, substrate tube 106 can be comprised of fluorine-doped silica material and have an inner diameter of about 22 mm.

In one embodiment, the PCVD system 100 includes a first insert tube 118 (first insert tube 118 shown in dotted lines in FIG. 3) mounted in the housing 113. A first sealed flange 119 (also shown in doffed lines in FIG. 3) is provided at the left end (as shown in FIG. 3) of gas supply unit 102 and around the outer circumference of first insert tube 118 to maintain a controlled environment within unit 102. First insert tube 118 is comprised of a metal or glass material. First insert tube 118 preferably has an inner diameter 126 of approximately 35 mm and a length of approximately 80 cm.

A gap or distance 128 between the right end of the first insert tube 118 and the left end of the coupler 116 is preferably approximately 42 mm. Preferably, a ratio of inner diameter 126 of first insert tube 118 to inner diameter 124 of coupler 116 is approximately 1.3:1.

In another embodiment, first insert tube 118 is replaced by a second insert tube 120 (second insert tube 120 shown in solid lines in FIG. 3). A second flange 121, similar to first flange 119 but with respect to second insert tube 120, provides a seal at the end of unit 102. Second insert tube 120 is also comprised of a metal or glass material. Second insert tube 120 has an inner diameter 130 equal, or approximately equal, to inner diameter 124 of coupler 116. Thus, a ratio of inner diameter 130 to inner diameter 124 is approximately 1:1. The length of second insert tube 120 is longer than the length of first insert tube 118. For example, the length of second insert tube 120 can be 84 cm. A gap or distance 132 between second insert tube 120 and coupler 116 is less than 5 mm. Alternatively, the length of tube 118 or 120 may be 0.5–1.2 m.

As an example, operating conditions for PCVD system 100 can include a temperature associated with tube 106 in the range between approximately 1150° C. and 1200° C., a microwave applicator traverse rate in the range of approximately 13–20 cm/sec, a microwave applicator traverse distance of approximately 80 cm or less, a total pressure of the gas mixture in the range of 5–20 Torr, and/or gas supply unit 102 maintained at a pressure in the range of 5–100 Torr.

The gas mixture transported into an internal region of tube 106 is transformed into a local area of plasma with the aid of the microwave applicator 115 in reaction zone 104. This plasma triggers coating or deposition of silica or doped silica onto the internal region of tube 106. Depending on the composition and/or the elements comprising the gas mixture, one or more distinct layers can be formed in the internal region of tube 106. For example, the first coating or layer laid down in tube 106 can correspond to the cladding and the second coating or layer can correspond to the core of a resulting optical fiber. Preferably, the tube 106, after the coating process(es), is collapsed to form a collapsed optical fiber cane (a slender silica-containing rod upon which further silica-containing soot such as cladding soot is deposited or which may be inserted into a sleeve in a rod-in-tube assembly method) or optical fiber preform.

Figure 1:
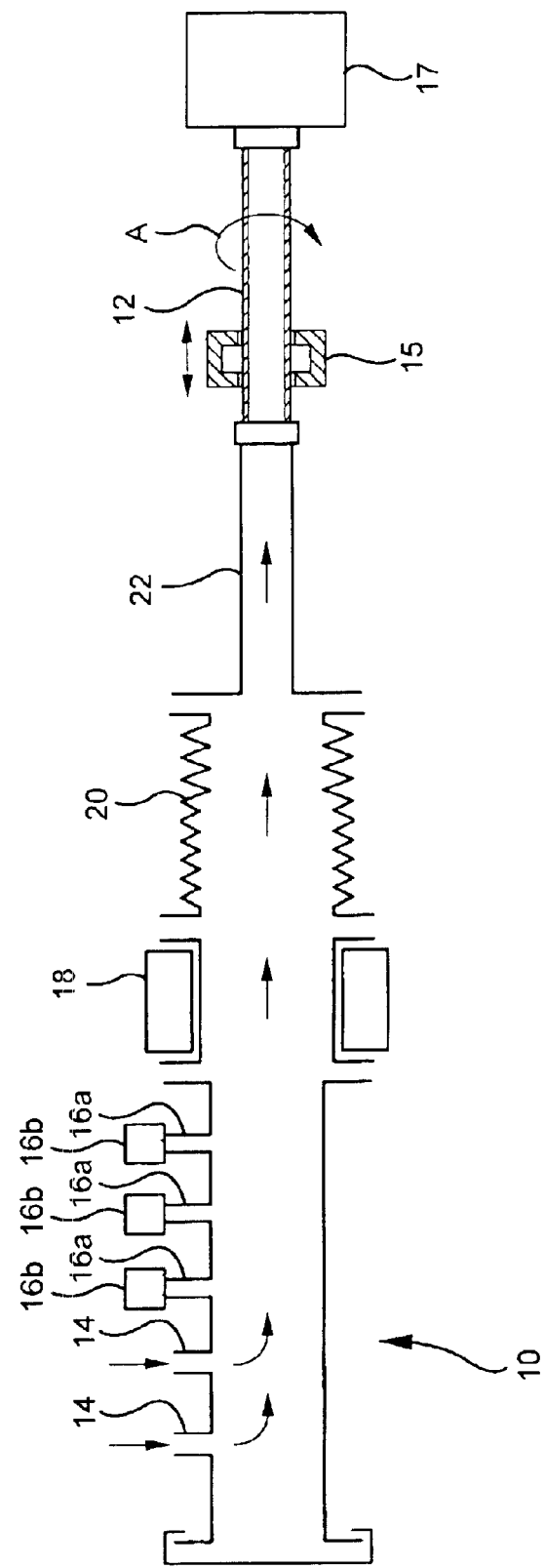
FIG. 1 is a schematic cross-sectional view of a portion of a plasma chemical vapor deposition (PCVD) lathe in accordance with the Prior Art.
Figure 2:
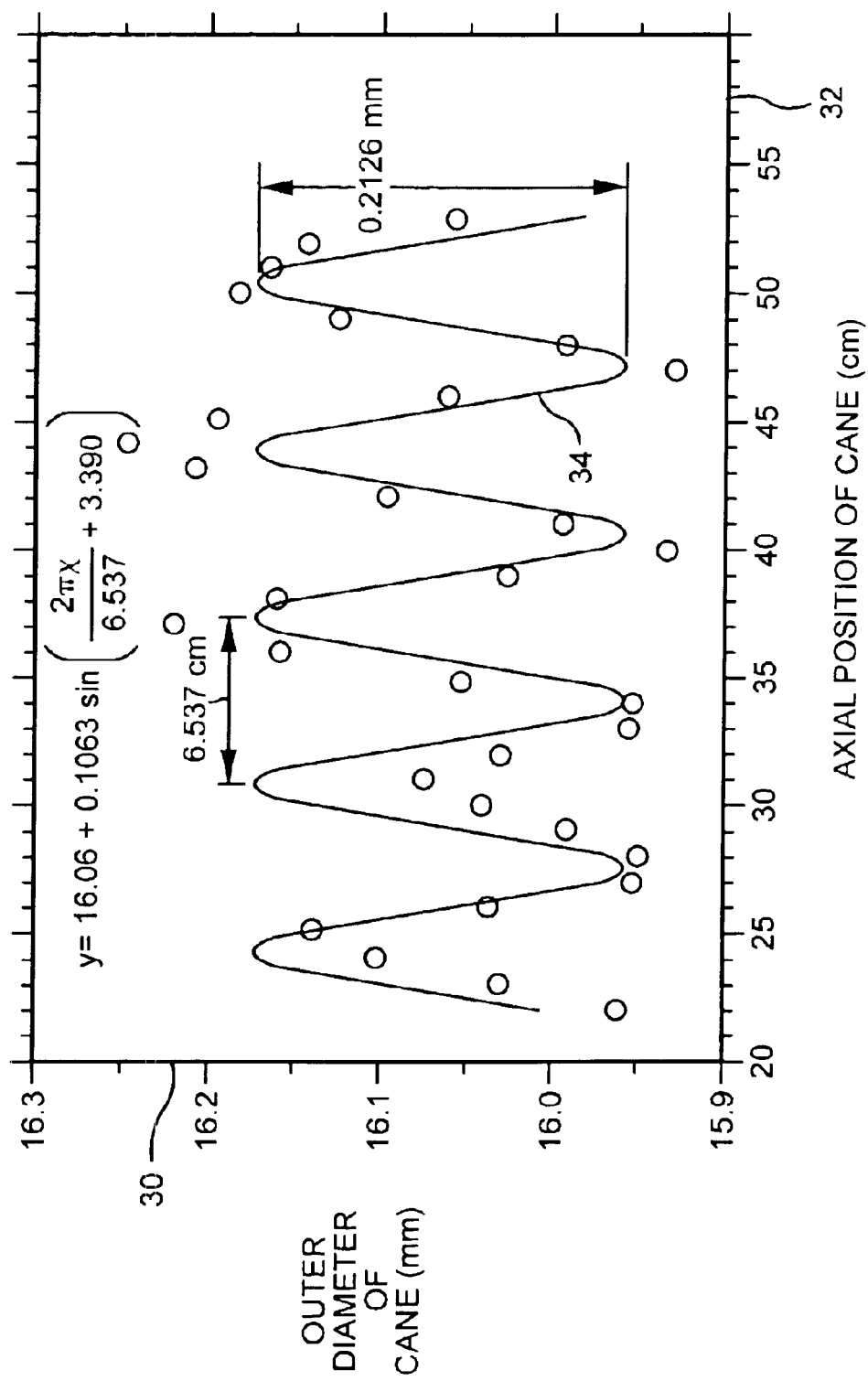
FIG. 2 is a plot showing variation in an outer diameter versus axial position of a collapsed cane according to the Prior Art formed from the PCVD lathe illustrated in FIG. 1.
Figure 4:
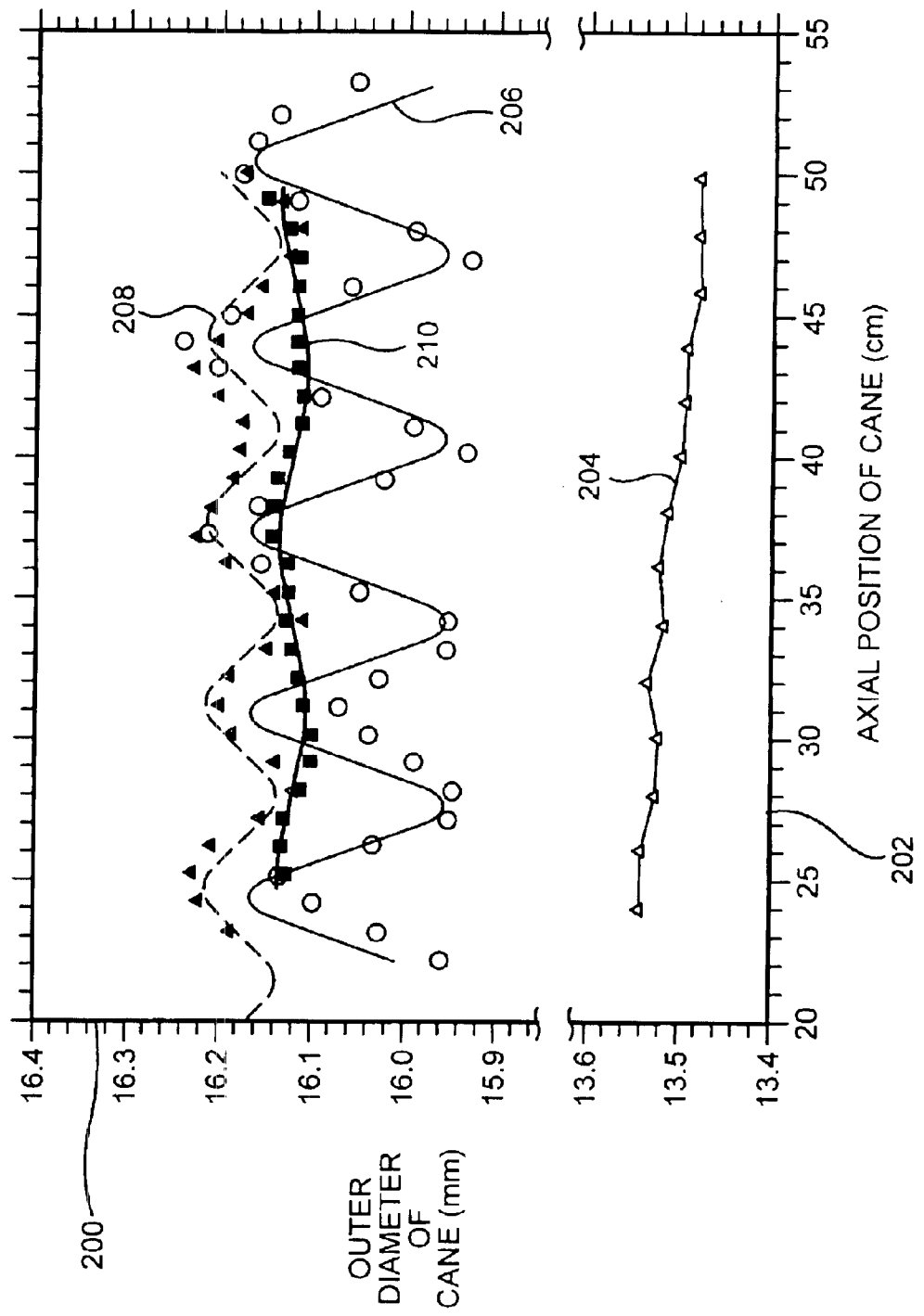
FIG. 4 is a plot showing variation in an outer diameter versus axial position of collapsed canes formed from various configurations of the PCVD system illustrated in FIG. 3.

FIG. 4 shows a plot of outer diameters versus axial positions of various collapsed canes. A vertical axis 200 denotes the outer diameter and a horizontal axis 202 denotes the axial position. Each of plot lines 204, 206, 208, and 210 shows the outer diameter of a collapsed cane as a function of its axial position. Plot line 204 corresponds to a collapsed cane formed from a substrate tube having an outer diameter of 25 mm and an inner diameter of 21 mm with no deposition. Plot line 206 corresponds to a collapsed cane formed from a substrate tube coated without the aid of an insert tube in the PCVD system, e.g., an PCVD system shown in FIG. 1 or PCVD system 100 without any insert tubes. Plot line 208 corresponds to a collapsed cane formed from a substrate tube coated with first insert tube 118 present in PCVD system 100. Plot line 210 corresponds to a collapsed cane formed from a substrate tube coated with second insert tube 120 present in PCVD system 100.

The collapsed cane formed using first insert tube 118 (plot line 208) exhibits a reduced range or amplitude in its outer diameter variation in comparison to the collapsed cane formed without any insert tube (plot line 206). The range or amplitude of variation in terms of the mass of the material deposited is less than +/−2% as measured over an appreciable length of the cane (see below the definition of an appreciable length). However, the periodicity of the outer diameter variation in plot line 208 is similar to that of plot line 206. The collapsed cane formed using second insert tube 120 (plot line 210) exhibits almost no variation in its outer diameter. The range or amplitude of diameter variation is less than +/−0.1%, which is equivalent to or less than a diameter variation typically present in tube 106 itself (e.g., a diameter variation of approximately 0.1% to 0.2%).

It is believed that a dimensional mismatch between gas delivery unit 102 and tube 106 (FIG. 3) can generate a disturbance in the gas mixture flow and induce a standing wave of a certain period and amplitude in the gas mixture flow. This standing wave, in turn, may be responsible for a given deposition within the internal region of tube 106 having a non-uniform thickness along its axial direction. The non-uniformity in the thickness of the deposition translates to non-uniformity in the outer diameter of the corresponding collapsed cane and the resultant optical fiber derived therefrom.

By configuring the PCVD system 100 to provide a uniform gas flow in the internal region of tube 106, depositions of uniform, or near uniform, thicknesses along the length of tube 106 can be achieved. In an exemplary embodiment, an insert tube is included in PCVD system 100 to provide a uniform gas flow (e.g., a gas flow with minimal disturbances, such as, standing waves) in tube 106. Among others, the inner diameter difference between the insert tube 106 and coupler 116, the length of the insert tube, and/or the gap distance between the insert tube and coupler 116 affect the gas flow characteristics in tube 106. As the dimension of the inner diameter of the insert tube 106 approaches the inner diameter 124 of coupler 116, variations in the outer diameter of the collapsed cane decreases. As the length of the insert tube is increased, the variation in the outer diameter of the collapsed cane decreases. As the gap distance between the insert tube and coupler 116 is reduced, the variation in the outer diameter of the collapsed cane decreases.

A difference in the inner diameters of the insert tube and coupler 116 of approximately 5% or less and/or a gap distance between the insert tube and coupler 116 of approximately 5 mm or less provides a uniformity in the coating weight along the axial direction of less than +/−4% as measured over an appreciable length of the substrate tube. In particular, a uniformity in the coating thickness(es) of less than +/−0.1% may be achieved as measured over an appreciable length of the substrate tube. An appreciable length is more than one complete cycle of the variation if the cycle is sinusoidal and preferably over a length encompassing several cycles. Typically, several cycles will include a length of 25 cm or more.

In an alternate embodiment, desirable coating uniformity can be achieved by matching the inner diameter of gas delivery unit 102 or the insert tube 120 to the inner diameter of tube 106. For example, when coupler 116 is not present in PCVD system 100, the insert tube can be disposed next to tube 106. In this example, the applicable gap distance, as discussed above, would be between the insert tube and tube 106. In still another alternative embodiment, inner diameter 124 of coupler 116 may be on the order of tube 106.

It is contemplated that factors other than the inner diameter difference, length, and/or gap distance associated with the insert tube can affect the uniformity of coating thicknesses in the internal region of tube 106. PCVD system 100 can include alternative or additional components to facilitate uniformity in the gas flow to tube 106. For example, gases may be inputted to inlets 108 having particular characteristics. It is also contemplated that other types of deposition or coating systems, such as, a modified chemical vapor deposition (MCVD) system, susceptible to having varying diameters and/or gaps along a gas mixture path, may also benefit from the exemplary embodiments of the present invention.

It is understood that although the detailed drawings, specific examples, and particular values describe the exemplary embodiments of the present invention, they are for purposes of illustration only. The exemplary embodiments of the present invention are not limited to the precise details and descriptions described herein. For example, although particular materials or characteristics are described, other materials or characteristics can be utilized. Various modifications may be made in the details disclosed without departing from the spirit of the invention as defined in the following claims.

What is claimed is:

1. An apparatus for coating a substrate tube used to form a glass article, the apparatus comprising:

a substrate tube holder adapted to support a substrate tube; and a gas delivery unit adjacent to the substrate holder, said gas delivery unit including a housing having an internal cavity extending along a length of the housing, an insert tube mounted in and extending into the internal cavity of the housing and forming a space between the housing and insert tube wherein the insert tube extends through the housing but terminates before and does not extend into the substrate tube, said gas delivery unit configured to coat an internal portion of the substrate tube in the substrate tube holder with a thickness variation along the axial direction of less than +/−4% by weight as measured over an appreciable length of the substrate tube.

2. The apparatus of claim 1 wherein the gas delivery unit further includes a rotary unit adapted to rotate the substrate tube and wherein the substrate tube holder further comprises a coupler supporting one end of the substrate tube.

3. The apparatus of claim 2 further comprising an inner diameter of the insert tube and an inner diameter of the substrate tube that differ by less than 5%.

4. The apparatus of claim 3 wherein a ratio of the inner diameter of the insert tube to the inner diameter of the substrate tube is approximately 1:1 and the thickness variation along the axial direction of the coated substrate tube is less than +/−0.1% as measured over an appreciable length of the substrate tube.

5. The apparatus of claim 1 wherein the glass article is selected from a group consisting of a cane and an optical fiber preform.

6. An apparatus for coating a substrate tube used to form a glass article, the apparatus comprising:

a substrate tube holder adapted to support a substrate tube; and a gas delivery unit adjacent to the substrate holder, said gas delivery unit including a housing, an insert tube mounted in the housing wherein the insert tube terminates before and does not extend into the substrate tube, wherein the gas delivery unit further includes a rotary unit adapted to rotate the substrate tube and wherein the substrate tube holder further comprises a coupler supporting one end of the substrate tube, said gas delivery unit configured to coat an internal portion of the substrate tube in the substrate tube holder with a thickness variation alone the axial direction of less than +/−4% by weight as measured over an appreciable length of the substrate tube and wherein the insert extends into the rotary unit and a bellows mounted between the housing and the substrate tube holder.

7. The apparatus of claim 6 further comprising a separation distance between the insert tube and the coupler is less than 5 mm.

8. An apparatus for internally coating a substrate tube using a plasma, the substrate tube extending along an axial direction, the apparatus comprising:
- a housing,
- a gas delivery tube mounted in the housing, said gas delivery tube configured to deliver a gas mixture, the gas delivery tube having a first end, a second end, a length, and an inner diameter; and
- a connector tube disposed between the second end of the gas delivery tube and the substrate tube, the second end of the gas delivery tube and an end of the connector tube being separated by a gap, wherein at least one of the inner diameter of the gas delivery tube, the length, the gap, and a flow of the gas mixture is configured to internally coat the substrate tube to a substantially uniform coating thickness along the axial direction.

9. The apparatus of claim 8 wherein the inner diameter of the gas delivery tube and an inner diameter of the substrate tube are substantially equal to each other.

10. The apparatus of claim 8 wherein the gap is equal to or less than about 40 mm.

11. The apparatus of claim 8 wherein the length is between about 0.5 m and 1.2 m.

12. The apparatus of claim 8 wherein the gas mixture is inputted to the first end of the gas delivery tube and the first end is opposite the second end.

13. The apparatus of claim 8 wherein a ratio of the inner diameter of the gas delivery tube to an inner diameter of the substrate tube is approximately 1.3:1 and the gap is approximately 42 mm.

14. The apparatus of claim 8 wherein a ratio of the inner diameter of the gas delivery tube to an inner diameter of the substrate tube is approximately 1:1 and the gap is approximately 5 mm.

15. An apparatus for internally coating a substrate tube, comprising:
- a gas delivery unit including a housing having an internal cavity extending along a length of the housing and an insert tube mounted into the housing said insert tube extending into the internal cavity of the housing and forming a space between the housing and insert tube and wherein the insert tube extends through the housing, said gas delivery unit being configured to deliver a gas mixture, and wherein the insert tube has an end, an inner diameter, and a length; and
- a coupling connector disposed between an end of the insert tube and the substrate tube
- wherein the diameter of the insert tube is substantially equal to the diameter of the substrate tube and the insert tube and an end of the connector are separated by a gap equal to or less than about 40 mm.

* * * * *